(12) United States Patent
Staack et al.

(10) Patent No.: US 7,756,979 B1
(45) Date of Patent: Jul. 13, 2010

(54) METHOD AND SYSTEM PROVIDING A MESSAGING SERVICE

(75) Inventors: Jens Staack, Helsinki (FI); Petri Koskelainen, Espoo (FI)

(73) Assignee: Nokia Corporation, Espoo (FI)

( * ) Notice: Subject to any disclaimer, the term of this patent is extended or adjusted under 35 U.S.C. 154(b) by 1740 days.

(21) Appl. No.: 10/332,574

(22) PCT Filed: Jul. 13, 2000

(86) PCT No.: PCT/EP00/06708

§ 371 (c)(1),
(2), (4) Date: Mar. 26, 2003

(87) PCT Pub. No.: WO02/07396

PCT Pub. Date: Jan. 24, 2002

(51) Int. Cl.
*G06F 15/16* (2006.01)
*G06F 15/173* (2006.01)

(52) U.S. Cl. .................. 709/227; 709/204; 709/206; 709/224

(58) Field of Classification Search .......... 709/206, 709/223–224, 227–228, 238
See application file for complete search history.

(56) References Cited

U.S. PATENT DOCUMENTS

| | | | | |
|---|---|---|---|---|
| 4,468,813 A | * | 8/1984 | Burke et al. | 340/7.57 |
| 5,732,219 A | * | 3/1998 | Blumer et al. | 709/227 |
| 5,964,831 A | * | 10/1999 | Kearns et al. | 709/201 |
| 5,983,366 A | * | 11/1999 | King | 714/38 |
| 6,185,599 B1 | * | 2/2001 | Salimando et al. | 709/202 |
| 6,260,148 B1 | * | 7/2001 | Aggarwal et al. | 726/14 |
| 6,438,215 B1 | * | 8/2002 | Skladman et al. | 379/67.1 |
| 6,510,454 B1 | * | 1/2003 | Walukiewicz | 709/206 |
| 6,640,241 B1 | * | 10/2003 | Ozzie et al. | 709/204 |
| 6,757,732 B1 | * | 6/2004 | Sollee et al. | 709/227 |
| 7,392,281 B1 | * | 6/2008 | Kanojia et al. | 709/202 |
| 2004/0093387 A1 | * | 5/2004 | Wick | 709/207 |

FOREIGN PATENT DOCUMENTS

| | | |
|---|---|---|
| EP | 0 833 532 | 9/1997 |
| WO | WO-97/47121 | 12/1997 |

(Continued)

OTHER PUBLICATIONS

Handley et al. RFC: 2543, SIP: Session Initiation Protocol, pp. 1-3, 24-33, 37-70, Mar. 1999.*

(Continued)

*Primary Examiner*—Nathan Flynn
*Assistant Examiner*—Joshua Joo
(74) *Attorney, Agent, or Firm*—Harrington & Smith

(57) ABSTRACT

The invention is directed to a instant messaging method and communication system comprising one or more network elements, wherein a connection from one to another network element can be established using a protocol which allows the sending of one or more messages from the one to the another network element as part of one or more protocol words. The protocol includes a protocol portion allowing a network element to specify whether or not the message is to be stored in case it cannot be promptly delivered to the another network element. The protocol portion preferably is part of the protocol header. The protocol may be a Session Initiation Protocol (SIP), and the message can be contained in an Invite request sent from the sending equipment to the receiving equipment.

40 Claims, 6 Drawing Sheets

FOREIGN PATENT DOCUMENTS

| WO | WO-98/00787 | 1/1998 |
| WO | WO-98/09421 | 3/1998 |
| WO | WO-00/69140 A1 | 11/2000 |

OTHER PUBLICATIONS

Schulzrinne, et al. "Internet Telephony: architecture and protocols—an IETF perspective", XP-000700321, vol. 31, No. 3, Feb. 11, 1999, pp. 237-255.

Schulzrinne H. et al., "Internet Telephony: Architecture and Protocols—an IETF Perspective", Computer Networks and ISDN Systems, North Holland Publishing, Amsterdam, NL, vol. 31, No. 3, Feb. 11, 1999, pp. 237-255, ISSN: 0169-7552.

Collesei P. et al., "SMS Based Applications for GSM Networks", CSELT Technical Reports, Torino, IT, vol. 23, No. 3, Jun. 1995, pp. 337-349, ISSN: 0393-2648.

Day, M. et al.; "Instant Messaging/Presence Protocol Requirements", RFC 2779, Feb. 2000.

Day, M. et al.; "A Model for Presence and Instant Messaging", RFC 2778, Feb. 2000.

Ineternet Engineering Task Force; Internet Draft; Handley/Schulzrinne/Schooler/Rosenberg; draft-ietf-sip-rfc2543bis-oo.txt; Jul. 13, 2000.

3G TS 23.040 V3.4.1 (Apr. 2000); $3^{rd}$ Generation Partnership Project; Technical Specification Group Terminals; Technical realization of the Short Message Service (SMS); (Release 1999).

* cited by examiner

METHOD AND SYSTEM PROVIDING A MESSAGING SERVICE

FIELD OF THE INVENTION

The invention relates to a communication method and system implementing a messaging service

BACKGROUND OF THE INVENTION

Several networks provide messaging services which allow messages to be sent from one to another network terminal without necessity of actually initiating a call. For instance, a plurality of GSM networks support a short message service (SMS) which permits the transmission of short messages. A more recent development is the multimedia messaging service (MMS) which allows the transmission not only of text messages but also of pictures and the like. Both these SMS and MMS are store-and-forward messaging services which necessitate additional network elements (e.g. SMSC, Short Message Service Center) and dedicated protocols such as specified in ETSI TS 23.040.

Moreover, the Internet provides a direct user-to-user messaging for chatting or instant messaging (e.g. using Instant Messaging/Presence Protocol IMPP). Further, the Internet offers a store-and-forward messaging, e.g. e-mail service (POP3 "Post Office Protocol, version 3" or IMAP4 "Internet Message Access Protocol, Version 4").

Presently, some instant messaging services are either based on existing standards, or are proprietary solutions such as AOL instant messaging service. Some requirements of future instant messaging services are defined in IETF RFC 2778 and RFC 2779. The instant messaging service requests both sender and receiver to be on-line and registered to the instant messaging server. When the receiver is e.g. not reachable, no instant message can be delivered.

For establishing a bidirectional connection between a caller and a callee, several call control protocols such as SIP (Session Initiation Protocol, see e.g. RFC 2543 and RFC 2543bis) are proposed. SIP may not only be used as a call control protocol but also offers the possibility of being used as instant messaging service. For instance, the SIP INVITE message can be used to carry content payloads (MIME types such as JPEG) inside one protocol message without the need of actually setting-up a voice-over-IP (VoIP) call. Other SIP message types (e.g. INFO) may also be used and new message types may be defined for this purpose. Note that the INVITE message is a signalling message. As an example, a user A may include the following MIME-payloads into one INVITE message for the user B:

image/jpeg (e.g. to send a picture)
audio/midi (e.g. for playing a sound clip).

All such information fits into one SIP message.

FIG. 3 shows one example of using the INVITE message as a messaging possibility. The names and numbers of the messages shown in FIG. 3 are as defined in RFC 2543. First, user A sends an INVITE message (F1) to user B which message includes the payload. User B responds by returning "100 Trying" (F2), "180 Ringing" (F3), and "200 OK" (F4), which confirms receipt of the message. User A then sends a "BYE" message (F5), to user B which acknowledges this message by returning "200 OK" (F6).

SIP-based messaging provides the advantage of being usable without need of any new network elements and is therefore cheap, and may possibly replace other messaging services.

However, for performing this SIP-based messaging, both sender and receiver must be "on-line", i.e. user B must be actually reachable.

SUMMARY OF THE INVENTION

The present invention aims at providing a messaging service which can easily be implemented without need of new network elements, and which offers enhanced messaging possibilities.

The present invention provides a method and/or system as defined in any one of the claims. Further, the invention provides network element adapted to perform the necessary functions.

In accordance with one aspect of the invention, the instant messaging service is enhanced by providing a storing capability for messages. When the intended receiver of the message is presently unable to receive the message because he is e.g. not on-line, busy and/or not reachable by the network, e.g. by the proxy server of the receiving user, because of any other reason, the message may be stored. This saving of the message enables its later delivery to the receiving user when this user is able to receive the message, e.g. after re-attachment to the network. No connection for bi-directional communication needs to be established.

The protocol normally used for initiating a connection enabling e.g. a bi-directional communication between a call originating equipment and a call terminating equipment thus serves the further purpose of indicating whether or not transmitted instant messages are to be stored in case of impossibility of direct delivery. The protocol allowing messages to be sent from the sending to the receiving equipment as part of the protocol, is amended so as to be able to include an identifier which may be or include a store command. The store command can be, in a preferred implementation a store-and-forward command. A serving network element trying to provide a connection to the receiving equipment in vain, is preferably adapted to check the protocol with respect to the inclusion of such an identifier representing a store command. When the store command is found, the message is not simply discarded but is stored in an appropriate place, such as in an own memory of this network element, or in a storage of another network element such as a server.

As the identifier can be included in the protocol, the message and the identifier (e.g. store command) can be transmitted in a unidirectional manner from the sending equipment to the serving network element provided for establishing connections to the receiving equipment. This feature significantly reduces the signalling and traffic load necessary for transmitting and handling messages. In addition, no new protocols for messaging are necessary, and the invention can be implemented in existing networks in an inexpensive manner. Furthermore, no new network elements are necessary for implementing the invention, so that the disclosed technique is easily and inexpensively deployable by a network operator or service provider. This messaging service structure may also replace existing messaging services and hence contribute to a harmonisation of messaging services.

The protocol preferably used is the Session Initiation Protocol SIP. The protocol comprises a portion allowing a network element, preferably the sending network element, to specify whether or not the message is to be stored, or stored-and-forwarded, by respectively setting or including the identifier. This protocol portion is preferably part of the protocol header. The message receiving element which may be the serving network element serving the presently unreachable receiving network element, is able to easily check the protocol header with regard to existence of such a store, or store-and-forward, command, and will decide on storing or discarding of the message depending on the command included in the protocol header (if any).

The message is preferable sent in an INVITE request or in other SIP request sent from the sending to the receiving equipment.

When the command is a mere "store" command, the message will be stored, and the sending equipment will have to search for any stored messages, e.g. when re-attaching to the network. In case of a store-and-forward command, the system is adapted to automatically forward the message to the receiving equipment. This forwarding may e.g. be tried on a periodical basis, or may be performed when detecting that the receiving equipment can be reached again.

The network element providing this storing, or storing-and-forwarding service may be a server such as a proxy server which is already provided as part of existing networks.

One embodiment of the present invention is an apparatus that includes a transmitter. The transmitter can be configured to communicate messages according to a protocol that allows an establishment of a connection between at least two terminals and allows the sending of at least one protocol word for sending an instant messaging message between a sender and a recipient. The transmitter can also be configured to communicate said instant messaging message in a protocol word according to an instant messaging protocol, wherein said protocol word includes a header, a message field and an identifier, wherein said message field includes a payload, wherein said identifier of the protocol word is configured to specify whether or not the instant messaging message included in the protocol word including the identifier is to be stored when the instant messaging message cannot be promptly delivered to the recipient which cannot be reached or accessed presently. The instant messaging message can be contained in an invite request.

Another embodiment of the present invention is an apparatus. The apparatus includes a receiver. The receiver can be configured to receive a protocol word in accordance with the protocol, wherein the protocol allows an establishment of a connection between at least two terminals and allows the sending of at least one protocol word for sending an instant messaging message from a sender to a recipient. The receiver can also be configured to receive a message according to the protocol, said instant messaging message being configured to be sent in the protocol word according to the instant messaging protocol, said protocol word including a header, a message field, and an identifier, said message field including a payload, said identifier of the protocol word specifying whether or not the instant messaging message included in the protocol word including the identifier is to be stored when the instant messaging message cannot be promptly delivered to the recipient which cannot be reached or accessed. The apparatus can be configured to check the identifier when the instant messaging message cannot be promptly delivered to the recipient. The receiver can be further configured to, when the instant messaging message cannot be promptly delivered to the recipient, store the instant messaging message when the identifier specifies storing, or not store the instant messaging message when the identifier specifies not storing.

A further embodiment of the present invention is a computer-readable storage medium encoded with instructions that, when executed by a computer, perform a process. The process can include using at least one message according to an instant messaging protocol, wherein the instant messaging protocol allows an establishment of a connection between at least two terminals and allows the sending of at least one protocol word for sending an instant messaging, in which a connection from a first network element to a second network element can be established using messages according to a protocol that allows an establishment of a connection between at least two terminals and allows the sending of at least one protocol word for sending an instant messaging message between a sender and a recipient. The process can also include receiving the instant messaging message in a protocol word according to the instant messaging protocol, wherein said protocol word includes a header, a message field, and an identifier, wherein said message field includes a payload, wherein said identifier of the protocol word specifies whether or not the instant messaging message included in the protocol word including the identifier is to be stored when the instant messaging message cannot be promptly delivered to the recipient which cannot be reached or accessed presently. The process can additionally include, when the instant messaging message cannot be promptly delivered to the recipient, storing the instant messaging message when the identifier specifies storing, or not storing the instant messaging message when the identifier specifies not storing.

In the following, further aspects, features and advantages of the invention will be described with reference to some embodiments as shown in the drawings.

An apparatus, according to one embodiment of the present invention, includes a transmitter configured to communicate messages according to a protocol that allows an establishment of a connection between at least two terminals and allows the sending of at least one protocol word for sending an instant messaging message between a sender and a recipient. The transmitter is also configured to communicate said instant messaging message in a protocol word according to an instant messaging protocol, wherein said protocol word includes a header, a message field and an identifier, wherein said message field includes a payload, wherein said identifier of the protocol word is configured to specify whether or not the instant messaging message included in the protocol word including the identifier is to be stored when the instant messaging message cannot be promptly delivered to the recipient which cannot be reached or accessed presently. In certain embodiments, the instant messaging message is contained in an invite request.

An apparatus, according to another embodiment of the present invention, includes a receiver configured to receive a protocol word in accordance with the protocol, wherein the protocol allows an establishment of a connection between at least two terminals and allows the sending of at least one protocol word for sending an instant messaging message from a sender to a recipient. The receiver is also configured to receive a message according to the protocol, said instant messaging message being configured to be sent in the protocol word according to the instant messaging protocol, said protocol word including a header, a message field, and an identifier, said message field including a payload, said identifier of the protocol word specifying whether or not the instant messaging message included in the protocol word including the identifier is to be stored when the instant messaging message cannot be promptly delivered to the recipient which cannot be reached or accessed, wherein the apparatus is configured to check the identifier when the instant messaging message cannot be promptly delivered to the recipient. The receiver is further configured to store the instant messaging message when the instant messaging message can not be promptly delivered to the recipient and the identifier specifies storing.

Another embodiment is a computer-readable storage medium encoded with instructions that, when executed by a computer, perform a process. The process includes using at least one message according to an instant messaging protocol, wherein the instant messaging protocol allows an establishment of a connection between at least two terminals and allows the sending of at least one protocol word for sending an instant messaging, in which a connection from a first network element to a second network element can be established using messages according to a protocol that allows an establishment of a connection between at least two terminals and allows the sending of at least one protocol word for sending an instant messaging message between a sender and a recipient. The process also includes receiving the instant messaging message in a protocol word according to the instant messaging protocol, wherein said protocol word includes a header, a message field, and an identifier, wherein said message field includes a payload, wherein said identifier of the protocol word specifies whether or not the instant messaging message included in the protocol word including the identifier is to be stored when the instant messaging message cannot be promptly delivered to the recipient which cannot be reached or accessed presently. The process further includes storing the instant messaging message when the instant messaging message cannot be promptly delivered to the recipient and the identifier specifies storing.

DETAILED DESCRIPTION OF PREFERRED EMBODIMENTS OF THE INVENTION

Figure 1:
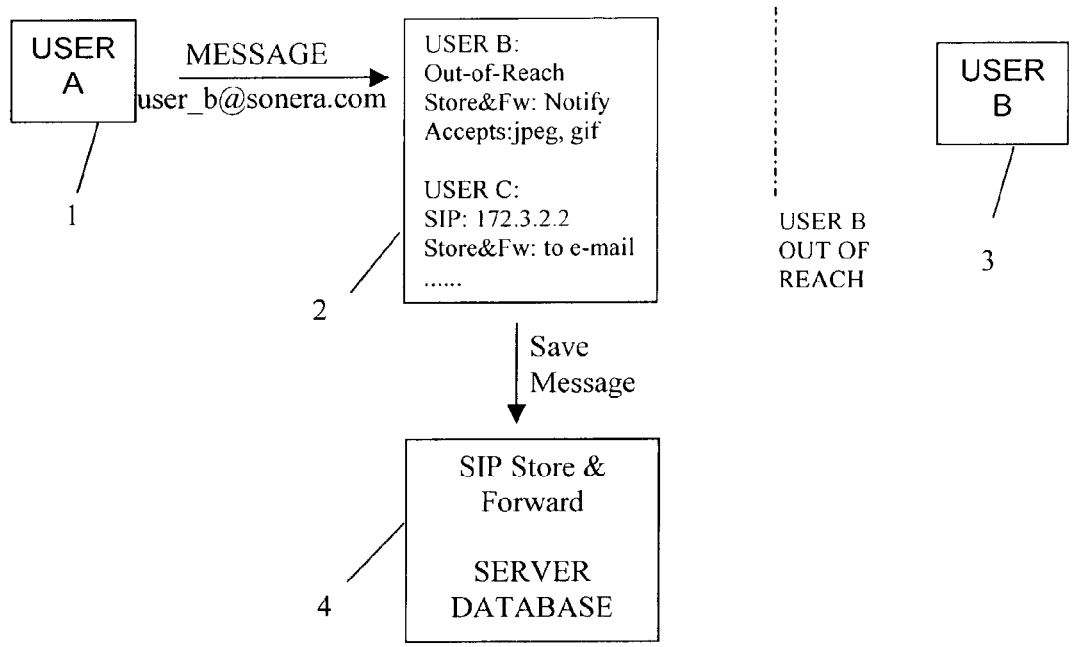
FIGS. 1 and 2 illustrate a preferred embodiment of a communication system in accordance with the invention.

FIG. 1 shows a first embodiment of the invention and illustrates a case where a message is to be sent from a first network element 1 (user A) to a second network element 3 (user B). The network elements 1, 3 are, in the present embodiment, client or user equipments such as terminals. In the present example, the network element 1 (user A) is an equipment trying to send a message (e.g. "MESSAGE user_b@sonera.com" addressed to user_b@sonera.com) to the receiving element 3 (user B) which is presently out of reach, e.g. switched-off, busy, or located in a non-supported area, or the like. The connection request of network element 1 is handled by a network element 2 which may be a server (such as a proxy server) which provides e.g. CSCF (Call Server Control Function), and/or is a home location server which contains a database storing information on the present locations of network element 3 and further network elements, reachability thereof, and the like.

As shown in FIG. 1, the server 2 stores parameters for several users (user equipments) to be served by server 2.

These parameters define the users profiles, network capabilities, and status of the users and terminals. For user B, the server 2 stores the information "out-of-reach"; "store-and-forward: notify"; "accepts: jpeg,gif", etc. This information may be updated by the server 2 or equipment 3 e.g. when re-entering the serving area of server 2, or when equipment 3 wants to change or supplement the types of acceptable messages. The "accepts" field defines the types of acceptable messages. The field "store-and-forward" can be set by equipment 3, or by the operator or service provider of the network to "NO", "YES", "NOTIFY" (when the sending user is to be notified after successful delivery of the message to the user B)", "Forwarding Address or Service for forwarding messages", and the like. The operator or service provider may provide different storing services for different subscribers, such as no storing possibility for normal subscribers, and storing possibility for premium subscribers.

The server 2 furthermore stores e.g. for user C the present IP address "172.3.2.2" for reaching user C, e.g. via SIP. For user C, the field "store-and-forward" is set to "to e-mail" so as to forward any incoming SIP message to the e-mail address of user C. The server 2 preferably contains further information for users B, C and additional users served by this server.

The network additionally contains a network element such as a server 4 used for storing any SIP message not promptly deliverable to the intended recipient. This server 4 is, in the present embodiment, not only used as a storing server but also as a forwarding server for actively forwarding any stored message to the recipient, e.g. periodically or when receiving information that the recipient is reachable again.

As mentioned above, in the example shown in FIG. 1, the user A is trying to send a message "MESSAGE USER_B@sonera.com" to user B using SIP. The SIP message is handled by server 2 which checks reachability of the recipient user B and detects that user B is presently out of reach. The server 2 then checks the contents of its database field "store-and-forward" set for user B, and detects the condition "notify". Server 2 additionally checks the type of received message which, in the present example, may be a type "jpeg". When this type of message is not comprised in the types mentioned in the field "accepts", the message is discarded. Otherwise, server 2 addresses server 4 for saving the presently undeliverable message received from user A. Hence, the SIP message is stored in the database of server 4 and waiting for later delivery to user B.

Figure 2:
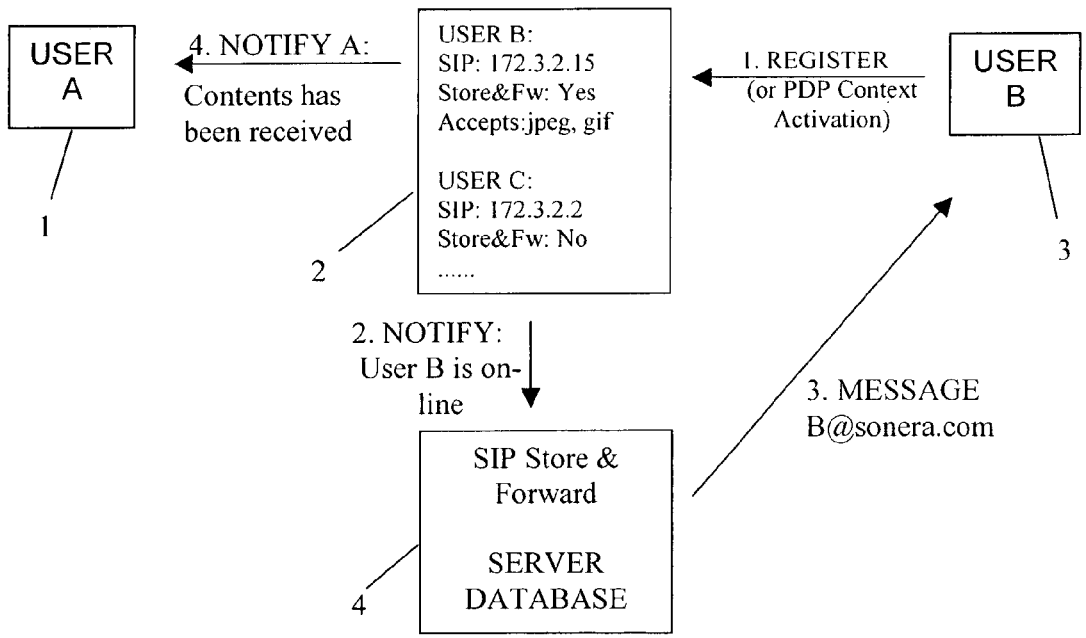
Figure 3:
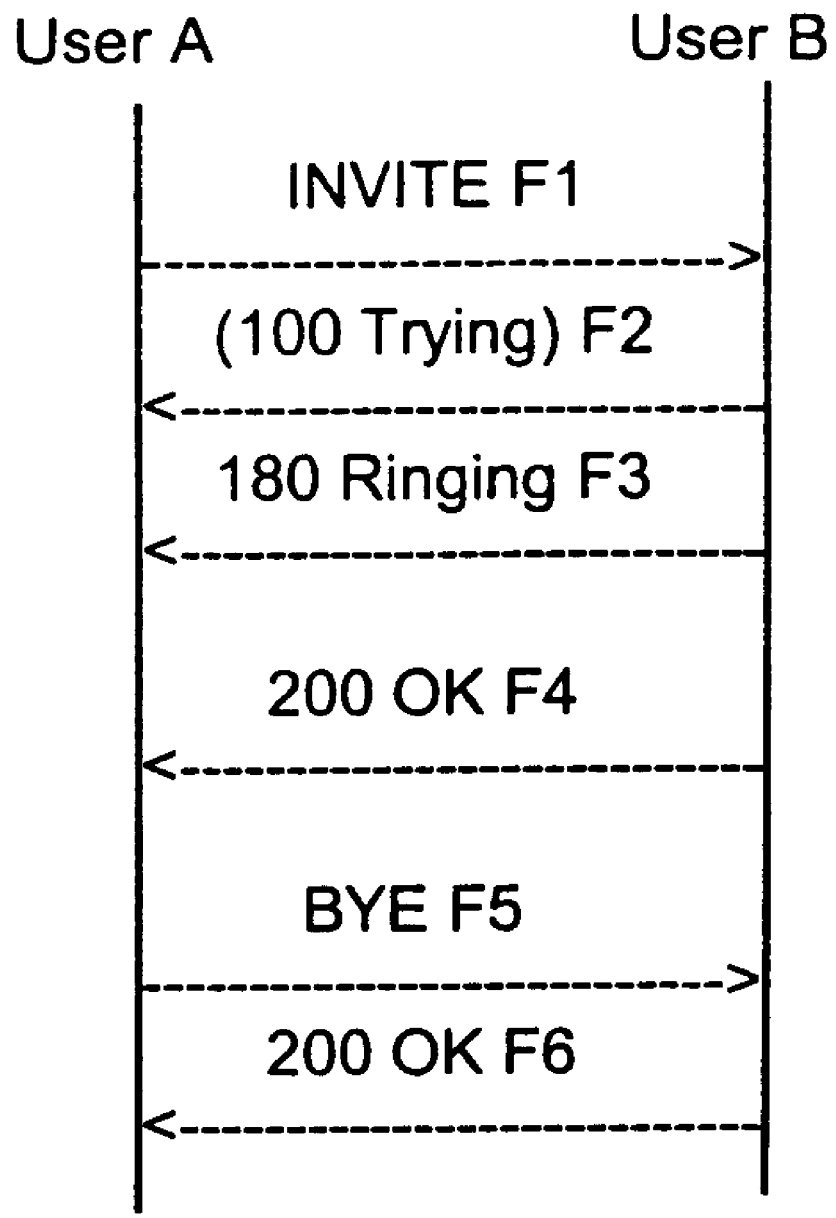
FIG. 3 shows the basic signalling messages between user equipments based on SIP.

FIG. 2 shows the embodiment of FIG. 1 in a condition where the user equipment 3 (user B) can be reached again. When the user equipment 3 can be reached again, it will usually send a message signalling its present state or condition, e.g. its intention to receive access to the network. Such a message is shown in FIG. 2 as step 1.) and may consist in a request "register", "PDP context activation", or the like, depending on the type of network and the like. Such a request is addressed to server 2 which therefore recognises the reachability of equipment 3. When detecting this situation, the server 2 sends, in step 2.) of FIG. 2, a message "notify: user B is on-line" to server 4. The server 4 checks its database with regard to any waiting message or messages stored for user B. When detecting such messages, the server 4 sends this message or messages directly to user equipment 3 as shown in step 3.), "MESSAGE USER_B@sonera.com". The server 4 may also be adapted to send a confirmation to server 2 after successful transmission of the stored messages to user equipment 3. The server 2 then preferably sends, in step 4.), a message to user equipment 1 informing the latter on successful delivery of the message to user equipment 3. This message is shown in FIG. 2 as "NOTIFY A: contents has been received".

Furthermore, the server 2 changes the conditions set for user B from "out of reach" to e.g. the address of user B, and/or the field "store-and-forward" to "YES". In the latter case, any message received for user B during subsequent unreachability thereof will simply be stored and forwarded after later reachability of user B, without sending any "notify" message to user A such as in step 4.) of FIG. 2.

As illustrated in FIG. 2, the server 2 may meanwhile also have changed the contents of the fields for user C from "to e-mail" (FIG. 1) to "NO" based on information received from the equipment of user C or the network operator or service provider.

The present invention therefore guarantees that the message contents (e.g. image or audio contents) of a SIP message is delivered to the receiver even if the receiver should be presently out of reach or occupied. For achieving this function, the invention defines an extension to the syntax of a connection protocol such as SIP which allows the sender to define whether or not the message should be temporarily stored when the receiver should presently be out of reach, and should be sent to the receiver as soon as possible. This local temporary storage of the message is performed taking account of the present status of the receiver. The storing place may be defined by the sender by adding a storing place address to the message. The storing place may also be defined by the serving server 2.

The standardisation drafts for SIP define that there may be a "request-disposition" header to specify caller preferences for the way how a server such as server 2 should process a request. The header can include the following items:

| | |
|---|---|
| Request-disposition = | "Request-disposition" ":" |
| | 1# (proxy-feature \| cancel-feature \| fork-feature \| recurse-feature \| parallel-feature \| queue-feature \| ring-feature) |
| proxy-feature = | "proxy" \| "redirect" |
| cancel-feature = | "cancel" \| "no-cancel" |
| fork-feature = | "fork" \| "no-fork" |
| recurse-feature = | "recurse" \| "no-recurse" |
| parallel-feature = | "parallel" \| "sequential" |
| queue-feature = | "queue" \| "no-queue" |
| ring-feature = | "ring" \| "no-ring" |

The invention extends this header to specify also "do-not-store" and "store-and-forward-if-not-reached", and the like.

"Do-not-store" means that this message should not be stored (e.g. it is instant in nature). "Store-and-forward-if-not-reached" means that this message should be stored, in a place defined by the sender, since it is important. E.g. if receiver was out-of-reach, this message is stored temporarily and sent to the receiver afterwards, as soon as possible. Usually local proxy (or e.g. yahoo like of proxy) will be the storing place. That proxy will be subscribed to presence status service and waits for a receiver to become on-line. When the receiver becomes on-line, the proxy gets a notification, and sends the message to the receiver. After 200 OK message, the proxy also (optionally) notifies the original sender that "Message has been delivered", using SIP NOTIFY method.

The above-described implementation ensures correct delivery to the receiver as soon as same is reachable again, e.g. after re-attaching to the network or terminating any ongoing call.

Figure 4:
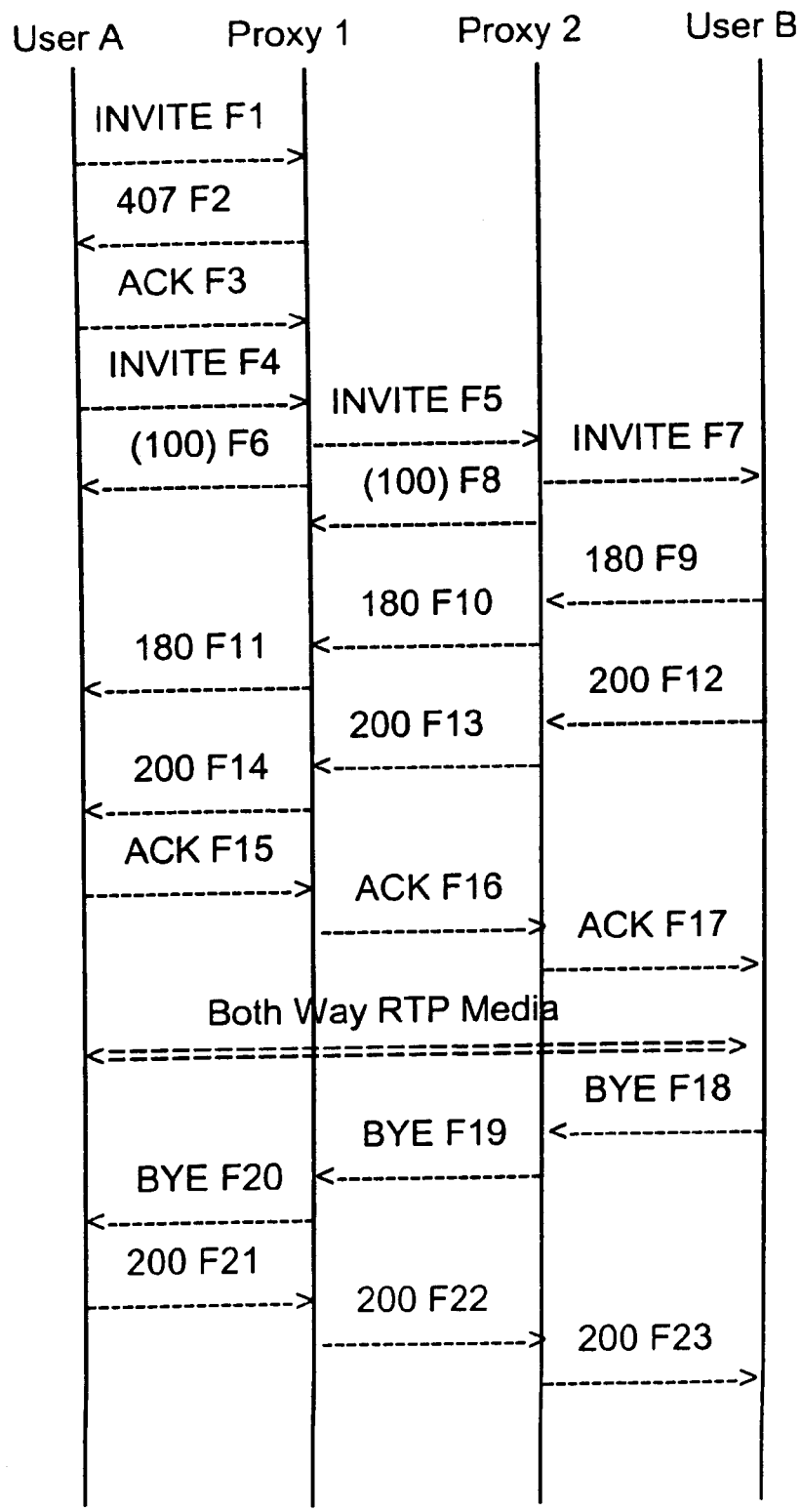
FIGS. 4 and 5 show further examples of successful SIP to SIP messaging using two proxy servers.

FIG. 4 shows a basic example of a SIP call performed when trying to establish a bi-directional media connection "Both way RTP media". The example of FIG. 4 shows a successful SIP to SIP connection between users A and B through two proxy servers, proxy 1 and proxy 2. The numbering F1 to F23 attached to the steps of FIG. 4 indicate the flow sequence whereas the words or numbers in front of this step numbering are in line with the definition of the SIP protocol. As the message flow and sequence steps of FIG. 4 are self-explanatory, no more detailed description is necessary.

Figure 5:
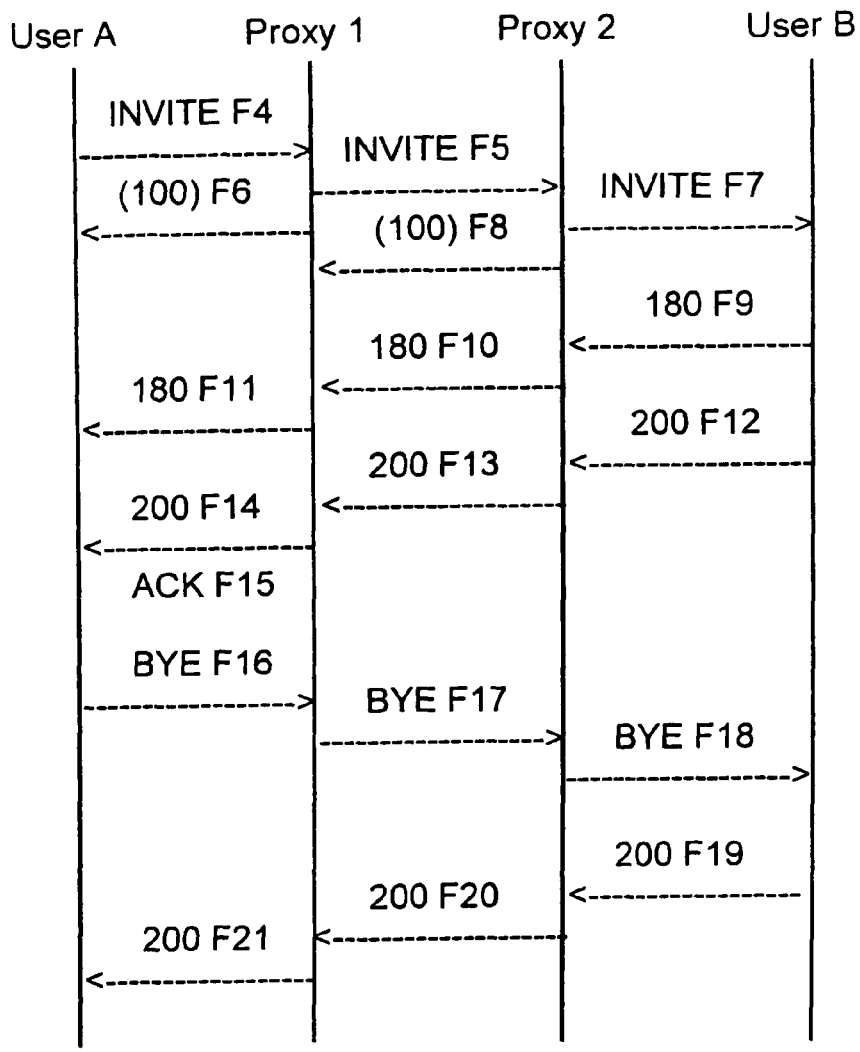

When, in accordance with the above-described embodiments, SIP is used for messaging, no "both way RTP media" is set-up. The flow may therefore proceed, in accordance with one embodiment of the present invention, as shown in FIG. 5. There are several flow possibilities to achieve SIP-based messaging.

The INVITE request message sent in step F4 of FIG. 5 contains the message payload (MIME types) sent from user A to user B.

In the following, one example of the INVITE request from user A to proxy 1 is shown:

```
F4 INVITE A -> Proxy 1
    INVITE sip:UserB@ss1.wcom.com SIP/2.0
    Via: SIP/2.0/UDP here.com:5060
    From: BigGuy <sip:UserA@here.com>
    To: LittleGuy <sip:UserB@there.com>
    Call-ID: 12345601@here.com
    CSeq: 1 INVITE
    Contact: BigGuy <sip :UserA@here.com>
    Authorization:Digest username="UserA", realm="MCI WorldCom SIP",
        nonce="wf84f1ceczx41ae6cbe5aea9c8e88d359", opaque=" ",
        uri="sip:ss1.wcom.com",
            response="42ce3cef44b22f50c6a6071bc8"
    Content-Type: multipart/mixed;
            boundary=gc0pJq0M:08jU534c0p
    Content-Length: 147
    v=0
    o=UserA 2890844526 2890844526 IN IP4 here.com
    s=Session SDP
    c=IN IP4 100.101.102.103
    t=0 0
    m=audio 49170 RTP/AVP 0
    a=rtpmap:0 PCMU/8000
    ------_=__ NextPart__gc0pJq0M:08jU534c0p
    Content-Type: image/jpeg; charset="iso-8859-1"
R0lGODlhuQEFAfAAAAAAAP///yH5BAEAAAEALAAAAAC5AQUBAAL+jI+py+0
```

-continued

P4wKUyouz3rz7D4biSJZmUAEnl7ZW5lbrTNf2jec6FrVKC+sJhz0IMcWQ7Z
bMpvO5U0lRVKnliMlqt9wuFwoOi8dkr/mMTqu35Lb7DRet5/S6nRjP6/d8w
/0PGOjVR1hoyCSYqLgIdOj4CBnCOElJF3mJmRlRydn5pQkamnnlWWqqJJqq
anjaaroKG5vnSlspe4tbVrsrmOv7+8QrXAdcbIwzNaw8eNzsvLQcjfRMXW0
jvWytvW1C If there is more than one payload in SIP, then multiparty MIME is used, as shown in the above example (Content-Type: multipart/mixed; boundary=gc0pJq0M:08jU534c0p). In the payload itself there are different MIME-types, separated by boundary.

If user B is not reachable then the immediate sending fails.

In order to have a store and forward service in accordance with the invention, several possibilities are described below.

1. Using the SIP Forward Capabilities:

User B has a "forwarding on not reachable" activated at proxy 2 (which may correspond to server 2 of FIGS. 1, 2). If User B can not be reached by proxy 2 then the proxy 2 forwards the message to the user's B "ghost user agent" B2, which can be a "connected" device which is always reachable/online, such as server 4. Then user agent B2 periodically tries to forward the message (using the same SIP based messaging capabilities) to the User agent B of the user B. The periodical forwarding timer can be of any kind. It may also be provided that the user agent B2 tries to forward the message only for a certain time and then discards it.

2. Forwarding the Message Payload to the User's B E-Mail Address:

If user B is not reachable by the proxy 2, then proxy 2 transfers the message payload (MIME type) to the user's B e-mail address (e.g. with SMTP) which may be specified in the INVITE message or which may be contained in a user profile option used by proxy 2.

3. Forward to MMS Server:

Same as in 2, but the message payload (MIME types) is forwarded to a MMS server. MMS stands for Multimedia Messaging Service as defined in 3GPP 22.140 and 23.140. The message is delivered when user B becomes reachable by the MMS server. This can be part of the user's B profile.

4. Forward to SMSC:

Same as in 2, but the text part of the message (MIME type TXT) is forwarded to the SMSC (Short Message Service Centre). The message is delivered when user B becomes reachable by the SMSC. This may be also part of the user's B profile.

Figure 6:
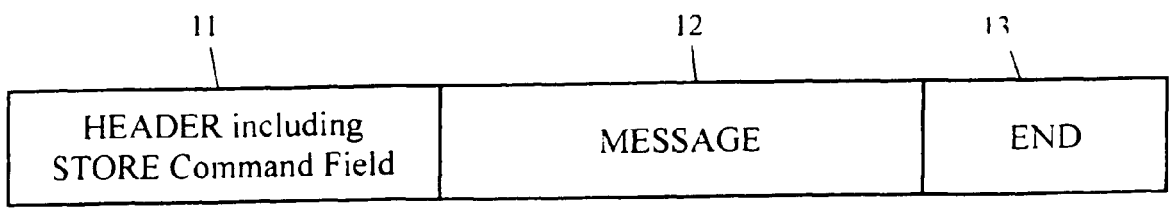
FIG. 6 illustrates the basic structure of a protocol word adapted in accordance with one implementation of the invention (based on SIP)

FIG. 6 shows an example of a basic structure of a SIP protocol word adapted in accordance with the present invention. The protocol word contains a header 11 which, in accordance with the invention, includes a "store command" field (as part of the protocol word). The "store command" field represents or includes an identifier which may be set, by the sender of the message, to the settings "store", "store-and-forward", "notify", or "do not store". The protocol word furthermore contains a message portion 12 containing a message e.g. of MIME type, and the usual end field 13.

In this example, a SIP INVITE message is used for carrying the payload, wherein the payload is inserted into the MIME field 12. When the receiving user B has activated "forwarding on not reachable" in his/her proxy server 2, the proxy server 2 will forward any received SIP message to a network element such as network element 4 (ghost user agent) which is a device always connected to the proxy server. The proxy server 2, or the server 4 may be adapted to periodically try to forward any stored message (using SIP) to the user equipment 3. A maximum lifetime period can be defined for undelivered messages saved in the storing network element such as server 4. Upon expiry of the lifetime period, stored undelivered messages will be cancelled.

As discussed above, the message payload may also be re-addressed to another address when the receiving user should not be reachable or occupied or the like, and may be addressed e.g. to the e-mail address (see the parameters stored for user C in FIG. 1), a MMS server, a SMSC, or the like.

Figure 7:
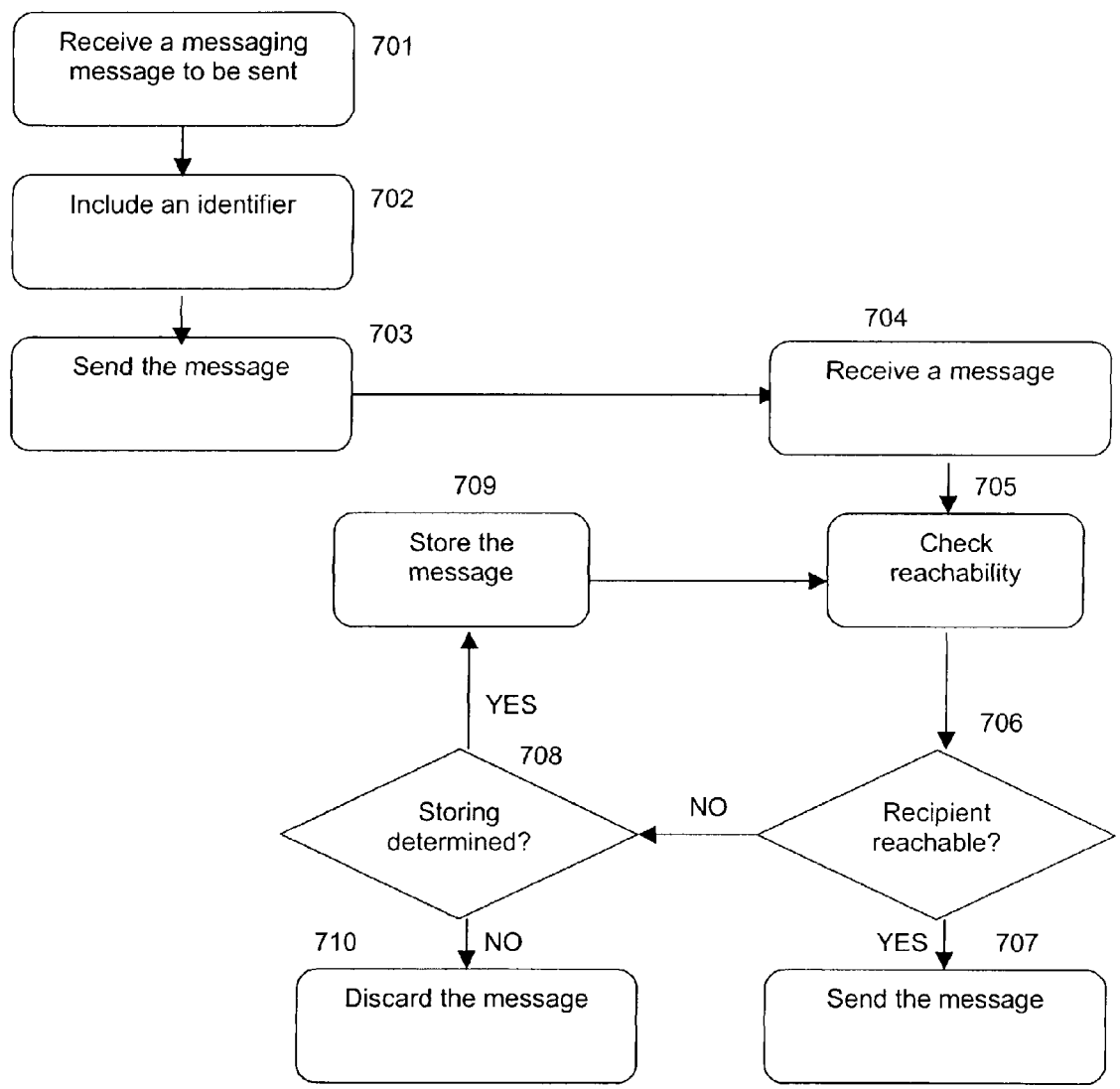
FIG. 7 shows a flow diagram illustrating an embodiment of a method according to the invention.

FIG. 7 shows a flow chart illustrating method steps executed in an embodiment of the invention. Steps 701 to 703 may be executed in a sender which may be the user equipment 1 of user A. In step 701, a messaging (i.e. no signalling) message to be sent is received which message may be input by a user via a terminal such as keyboard, digital camera and the like. On some embodiments message is received from another network element such as a messaging gateway acting as a gateway between the messaging system of the SIP based network and the WAP service centers connected to the GSM network. An identifier is included into, or added to, the message in step 702. The message and the identifier may be included into a protocol word such as SIP. Thereafter the message is sent in step 703. The sent message will be received, in step 704, by the addressed network element such as server 2 of FIGS. 1, 2.

The reachability of the recipient indicated in the message or transmitting protocol is checked in steps 705 and 706. When the recipient is reachable, the message is sent to the recipient in step 707. When, to the contrary, the recipient is presently not reachable, e.g. busy or de-attached from the network, the process proceeds to step 708 where the identifier of the received message is checked in order to decide on the temporary storing (step 709) of the message in an internal or external memory, e.g. in server 4, or immediate discarding of the message (step 710), depending on the status of the identifier. The status of the identifier may e.g. have the value "00" for storing, "11" for discarding, "01" for "Notify sender after delivery to the Recipient", and the like.

When a message is stored, the step 705 may be repeatedly executed until reachability of the sender is detected. The step 705 may additionally or alternatively be triggered e.g. when the recipient attaches again to the network. When reachability is found, the stored message is read out of the memory, and is sent to the recipient, e.g. from server 4 or 2.

Figure 8:
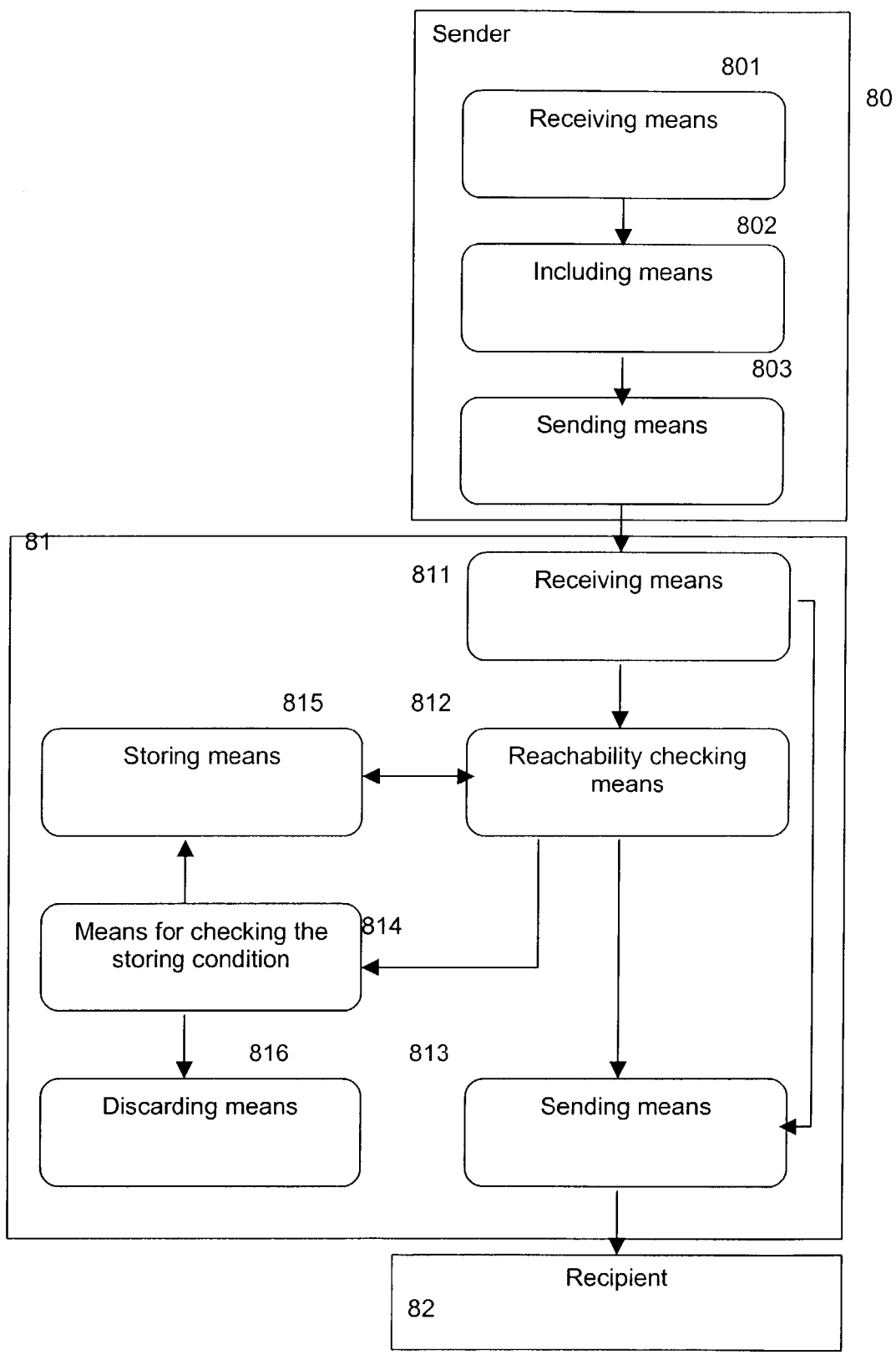
FIG. 8 shows a block diagram of an embodiment of a system in accordance with the invention.

FIG. 8 shows a block diagram of network elements of an embodiment of a system according to the invention. A sender 80 includes a receiving means 801 for receiving a messaging (i.e. no signalling) message (user traffic) to be sent, and is adapted to execute step 701 of FIG. 7. The message may be input via a terminal such as keyboard, digital camera and the like, or from another network element. The sender 80 further comprises an including means 802 for adding, or including, an identifier into the message, and eventually including the message into one or more protocol words of a messaging enabling protocol such as SIP, so as to carry out step 702. A sending means 803 is adapted to execute step 703, i.e. to send the protocol word(s) including the message and the identifier to a serving network element 81 such as server 2.

The serving network element 81 is adapted to carry out the steps 704 to 710 shown in FIG. 7. The serving network element comprises a receiving means 811 for receiving messages, e.g. the protocol word(s) sent from sender 80, and a reachability checking means 812 which checks whether the intended recipient 82 can be accessed so that the message can be promptly delivered to the intended recipient 82. If yes, the message is sent to a sending means 813 of the serving network element 81. The sending means 813 sends the message to the indicated receiving address, i.e. to the recipient 82.

When the checking means 812 detects that the recipient 81 can presently not be reached, it transfers the message to a checking means 814 which is adapted to check whether the message is to be stored or discarded. The checking means 814 performs this check by examining the identifier included in the message or protocol word. When the identifier does not command a storing of the message, the message is discarded by a discarding means 816 which e.g. actively deletes the message or simply inhibits a storing thereof. Otherwise, when the identifier commands the storing of the message if not promptly deliverable, the checking means 814 sends the message to a storing means 815 which may be an internal memory or an external storage such as in server 4.

When the checking means 812 subsequently detects that the recipient 81 may be reached again, it either retrieves the stored message from the storing means 815 and transfers the message to the sending means 813, or instructs the storing means 815 to transmit the message to the recipient 81 via other means, e.g. server 4.

According to one embodiment of the invention, the header 11, in particular, the Request-Disposition part, of the SIP protocol word is newly defined so as to include an identifier, preferably the protocol portion "store command field" which may contain the commands "do-not-store" or "store-and-forward-if-not-reached" according to the setting of user A. The first header "do-not-store" informs the system that the message is of instant nature and is to be discarded instantly if it cannot be promptly delivered. The latter header "store-and-forward-if-not-reached" means that the message should be stored (usually in the local proxy or another storage) and forwarded, if the receiving equipment is presently unreachable or occupied, or the like. The proxy will be subscribed to a present status service for being informed on the presence status, and will wait for the receiver to become on-line. As shown in FIG. 2, the proxy server 2 is adapted to send a notification (step 4) to the original sender 1 using SIP NOTIFY method, after the delivery of the message to the user B (200 OK message).

When the receiving user B is becoming on-line again, the network recognises this situation, e.g. by receiving a SIP REGISTER message or PDP-context activation request. The CSCF and home location server 2 inform the SIP store and forward server 4 about this situation, either using a SIP protocol or any other protocol. The servers 2 and 4 may be also be co-located inside the same machine.

Although preferred embodiments of the invention have been described above, the invention is not limited to the details thereof. Instead of SIP protocol, any other instant messaging protocol can be used provided it is no specific protocol intended only for messaging service but a protocol primarily intended for establishment of connection between two (or more) terminals.

The invention claimed is:

1. An apparatus, comprising:
   At least one memory including computer program code,
   at least one processor,
   the at least one memory and the computer program code being configured to, with the at least one processor, cause the apparatus at least to
   communicate messages according to a protocol that allows an establishment of a connection between at least two terminals and allows the sending of at least one protocol word for sending an instant messaging message between a sender and a recipient user; and
   communicate said instant messaging message in a protocol word according to an instant messaging protocol, wherein said protocol word includes a header, a message field and an identifier, wherein said message field includes a payload, wherein said identifier of the protocol word is configured to specify whether or not the instant messaging message included in the protocol word including the identifier is to be stored when the instant messaging message cannot be promptly delivered to the recipient user which cannot be reached or accessed presently,
   wherein the identifier is configured to have set therein a store-and-forward command.

2. The apparatus of claim 1, wherein the identifier is part of the protocol header.

3. The apparatus of claim 1, wherein the identifier is an extension field in the instant messaging message according to the protocol.

4. The apparatus of claim 1, wherein a first network element selected from the at least two terminals is configured to communicate with a second network element selected from the at least two terminals in a bi-directional manner.

5. The apparatus of claim 4, further comprising:
   a serving network element configured to transmit the instant messaging message from the sender to the recipient user, the serving network element being configured to control the storing of the instant messaging message when the recipient user is presently unreachable, to detect a subsequent reachability of the recipient user, and to initiate the forwarding of the stored message to the recipient user when detecting the reachability of the recipient user.

6. The apparatus of claim 4, wherein the identifier is configured to have a store-and-forward command set therein.

7. The apparatus of claim 1, wherein the protocol is a session initiation protocol.

8. The apparatus of claim 7, wherein the instant messaging message is contained in an invite request.

9. The apparatus of claim 7, wherein the instant messaging message is contained in an info message.

10. The apparatus of claim 1, comprising a server configured to store a message.

11. The apparatus of claim 10, wherein the server is a server configured to store and forward the instant messaging message to a recipient address that is different from a recipient address in the instant messaging message.

12. The apparatus of claim 10, wherein the server is a proxy server of the recipient user.

13. The apparatus of claim 10, wherein the server is configured to periodically try to send the stored message to the recipient user.

14. The apparatus of claim 10, wherein the server is configured to forward the instant messaging message to another address indicated in a database of the server or another network element, or in the protocol.

15. The apparatus of claim 11, wherein the server is a proxy server of the recipient user.

16. The apparatus of claim 11, wherein the server is configured to periodically try to send the stored message to the recipient user.

17. The apparatus of claim 11, wherein the server is configured to forward the instant messaging message to another address indicated in a database of the server or another network element, or in the protocol.

18. The apparatus of claim 1, further comprising:
a server network element configured to transmit the instant messaging message from the sender to the recipient user, the serving network element being configured to control the storing of the instant messaging message when the recipient user is presently unreachable, to detect a subsequent reachability of the recipient user, and to initiate the forwarding of the stored message to the recipient user upon detecting the reachability of the recipient user.

19. The apparatus of claim 1, wherein said identifier of the protocol word is configured to be set by the sender of the instant messaging message.

20. A method, comprising:
using messages according to an instant messaging protocol, wherein the instant messaging protocol allows an establishment of a connection between at least two terminals and allows the sending of at least one protocol word for sending an instant messaging, in which a connection from a first network element to a second network element can be established using messages according to the instant messaging protocol that allows an establishment of a connection between at least two terminals and allows the sending of at least one protocol word for sending an instant messaging message between a sender and a recipient user;
receiving the instant messaging message in a protocol word according to the instant messaging protocol, wherein said protocol word includes a header, a message field, and an identifier, wherein said message field includes a payload, wherein said identifier of the protocol word specifies whether or not the instant messaging message included in the protocol word including the identifier is to be stored when the instant messaging message cannot be promptly delivered to the recipient user which cannot be reached or accessed presently; and
when the instant messaging message cannot be promptly delivered to the recipient user, storing the instant messaging message when the identifier specifies storing, or not storing the instant messaging message when the identifier specifies not storing,
wherein the identifier is configured to have set therein a store-and-forward command.

21. The method according to claim 20, wherein the storing the instant messaging message comprises storing the instant messaging message in a server.

22. The method according to claim 21, wherein the storing the instant messaging message in the server comprises storing the instant messaging message in a server configured to store and forward the instant messaging message.

23. The method according to claim 21, wherein the storing the instant messaging message in the server comprises storing the instant messaging message in a proxy server of the recipient user.

24. The method according to claim 21, wherein the storing the instant messaging message in the server comprises storing the instant messaging message in a server configured to periodically try to send the stored message to the recipient user.

25. The method according to any one of claim 21 or 22, wherein the storing the instant messaging message in the server comprises storing the instant messaging message in a server configured to forward the instant messaging message to another address indicated in a database of the server or another network element, or in the protocol.

26. The method according to claim 20, further comprising:
storing, under control of a serving network element, the instant messaging message when the recipient user is presently unreachable;
detecting a subsequent reachability of the recipient user; and
initiating the forwarding of the stored message to the recipient user upon detecting the reachability of the recipient user.

27. The method according to claim 26, wherein the server is a proxy server of the recipient user.

28. The method according to claim 26, wherein the server is configured to periodically try to send the stored message to the recipient user.

29. The method according to claim 26, wherein the server is configured to forward the instant messaging message to another address indicated in a database of the server or another network element, or in the protocol.

30. The method according to claim 26, further comprising:
setting, in the identifier, a store-and-forward command.

31. The method of claim 20, wherein said identifier of the protocol word is configured to be set by the sender of the instant messaging message.

32. An apparatus, comprising:
at least one memory including computer program code,
at least one processor,
the at least one memory and the computer program code being configured to, with the at least one processor, cause the apparatus at least to
send a protocol word in accordance with an instant messaging protocol, wherein the instant messaging protocol allows an establishment of a connection between at least two terminals and allows the sending of at least one protocol word for sending an instant messaging message from a sender to a recipient user; and
send said instant messaging message in the protocol word according to the instant messaging protocol, said protocol word including a header, a message field and an identifier, said message field including a payload, said identifier of the protocol word specifying whether or not the instant messaging message included in the protocol word including the identifier is to be stored when the instant messaging message cannot be promptly delivered to the recipient user which cannot be reached or accessed presently,
wherein the identifier is configured to have set therein a store-and-forward command.

33. The apparatus of claim 32, wherein said identifier of the protocol word is configured to be set by the sender of the instant messaging message.

34. An apparatus, comprising:
at least one memory including computer program code,
at least one processor,
the at least one memory and the computer program code being configured to, with the at least one processor, cause the apparatus at least to
receive a protocol word in accordance with the protocol, wherein the protocol allows an establishment of a connection between at least two terminals and allows the sending of at least one protocol word for sending an instant messaging message from a sender to a recipient user;

receive a message according to the protocol, said instant messaging message being configured to be sent in the protocol word according to the instant messaging protocol, said protocol word including a header, a message field, and an identifier, said message field including a payload, said identifier of the protocol word specifying whether or not the instant messaging message included in the protocol word including the identifier is to be stored when the instant messaging message cannot be promptly delivered to the recipient user which cannot be reached or accessed, wherein the apparatus is configured to check the identifier when the instant messaging message cannot be promptly delivered to the recipient user; and when the instant messaging message cannot be promptly delivered to the recipient user, store the instant messaging message when the identifier specifies storing, or not store the instant messaging message when the identifier specifies not storing, wherein the identifier is configured to have set therein a store-and-forward command.

35. The apparatus of claim 34, wherein the protocol is a session initiation protocol.

36. The apparatus of claim 34, comprising a server configured to store the instant messaging message.

37. The apparatus of claim 34, wherein said identifier of the protocol word is configured to be set by the sender of the instant messaging message.

38. The apparatus of claim 34, wherein the server is a server configured to store and forward the instant messaging message to a recipient address that is different from a recipient address in the instant messaging message.

39. An apparatus, comprising:

at least one memory;

means for using messages according to a protocol, wherein the protocol allows an establishment of a connection between at least two terminals and allows the sending of at least one protocol word for sending an instant messaging, in which a connection from a first network element to a second network element can be established using messages according to a protocol that allows an establishment of a connection between at least two terminals and allows the sending of at least one protocol word for sending an instant messaging message between a sender and a recipient user;

means for receiving the instant messaging message in a protocol word according to an instant messaging protocol, wherein said protocol word includes a header, a message field, and an identifier, wherein said message field includes a payload, wherein said identifier of the protocol word specifies whether or not the instant messaging message included in the protocol word including the identifier is to be stored when the instant messaging message cannot be promptly delivered to the recipient user which cannot be reached or accessed presently; and means for storing the instant messaging message when the instant messaging message cannot be promptly delivered to the recipient user and the identifier specifies storing, wherein the identifier is configured to have set therein a store-and-forward command.

40. A non-transitory computer-readable storage medium encoded with instructions that, when executed by a computer, perform a process, the process comprising:

using at least one message according to an instant messaging protocol, wherein the instant messaging protocol allows an establishment of a connection between at least two terminals and allows the sending of at least one protocol word for sending an instant messaging, in which a connection from a first network element to a second network element can be established using messages according to a protocol that allows an establishment of a connection between at least two terminals and allows the sending of at least one protocol word for sending an instant messaging message between a sender and a recipient user;

receiving the instant messaging message in a protocol word according to the instant messaging protocol, wherein said protocol word includes a header, a message field, and an identifier, wherein said message field includes a payload, wherein said identifier of the protocol word specifies whether or not the instant messaging message included in the protocol word including the identifier is to be stored when the instant messaging message cannot be promptly delivered to the recipient user which cannot be reached or accessed presently; and, when the instant messaging message cannot be promptly delivered to the recipient user, storing the instant messaging message when the identifier specifies storing, or not storing the instant messaging message when the identifier specifies not storing, wherein the identifier is configured to have set therein a store-and-forward command.

* * * * *